H. KAIN, C. L. MILES AND G. A. WILKINSON.
ELECTRIC GLUE HEATER.
APPLICATION FILED JAN. 8, 1920.

1,351,478.

Patented Aug. 31, 1920.

Inventor
Harry Kain,
Con L. Miles,
Glenn A. Wilkinson
By Edward E. Clement
Attorney

UNITED STATES PATENT OFFICE.

HARRY KAIN, CON L. MILES, AND GLENN A. WILKINSON, OF WABASH, INDIANA.

ELECTRIC GLUE-HEATER.

1,351,478.  Specification of Letters Patent.  Patented Aug. 31, 1920.

Application filed January 8, 1920. Serial No. 350,139.

*To all whom it may concern:*

Be it known that we, HARRY KAIN, CON L. MILES, and GLENN A. WILKINSON, citizens of the United States, residing at Wabash, in the county of Wabash and State of Indiana, have invented certain new and useful Improvemen s in Electric Glue-Heaters, of which the following is a specification, reference being had therein to the accompanying drawing.

The present invention relates to electrically heated apparatus and more especially to an electrically heated glue pot of the double boiler type.

An object of the invention is to provide a device of the above type which will be durable, cheap to manufacture, simple in structure and easy and cheap to repair.

Another object of the invention is to provide such a device which will be proof against overheating or burning out.

Another object of the invention is to provide, in an electrolytically heated double boiler, such an arrangement of the parts and circuit connections as will enable the current to be reversed for the purpose of equalizing the wear on the electrodes without the use of special switching apparatus.

Various other objects of the invention will be apparent from a perusal of the following specification and the drawings accompanying the same.

The invention is illustrated in the accompanying drawings in which:—

Figure 1:
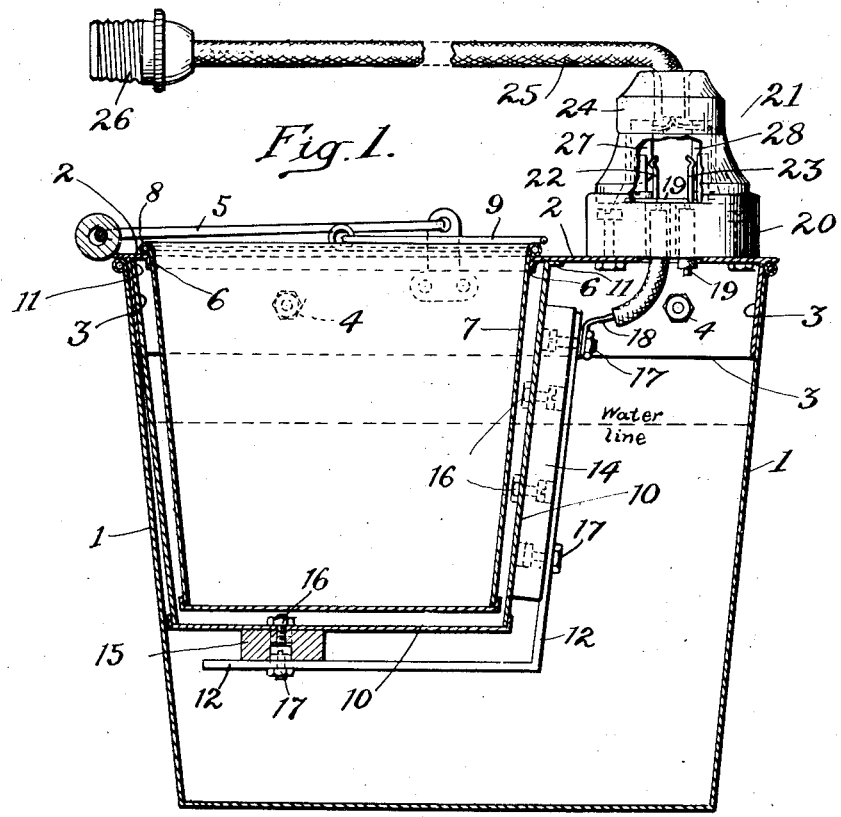
Figure 1 is a vertical cross-section of the device.
Figure 2:
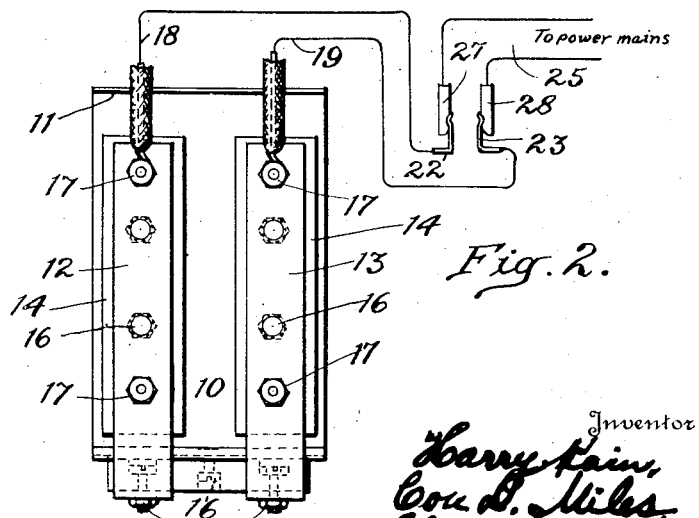
Fig. 2 is a back view of the electrodes and shield looking in the direction of the arrow in Fig. 1.

Referring to the drawings in detail, the device consists of an outer vessel 1 having a cover 2 provided with a flange 3 extending downwardly into the open end of the vessel 1 to the walls of which it is fastened by means of suitable bolts 4. A suitable bail or handle 5 is provided for the outer vessel. An opening 6 is provided in the cover 2, slightly offset to one side thereof, to receive the inner vessel 7 which is arranged to be supported by the cover at the rim of the opening 6 by means of a wired edge or rim 8, the two vessels being so proportioned in depth that the inner vessel will extend downwardly into the outer vessel well below a given level therein, namely the water level indicated in dotted lines. The inner vessel 7 is also provided with a suitable bail or handle 9. A screen 10 arranged to extend across the bottom and upper sides of the inner vessel, when the two vessels are in assembled relation as shown, is also carried by the cover 2, being fastened thereto in any suitable manner as by soldering or riveting at its upper extreme edges 11. The screen 10 is spaced throughout its length from the bottom and sides of the inner vessel.

A pair of L-shaped electrodes 12 and 13 of any cheap conducting material, preferably iron, is mounted to extend downwardly along the side and across the bottom of the shield 10 between it and the outer vessel and out of electrical contact therewith by means of mounting members 14 and 15 of suitable insulating material, held in place on the shield by means of bolts 16, and the electrodes being fastened to the mounting members by means of bolts 17, separated from the bolts 16 by the insulating body of the mounting members. The extreme upper bolt 17 of each of the electrodes is used as a binding post for its associated electrode.

A pair of circuit leads 18 and 19 extend from the uppermost bolts 17 of each of the electrodes 12 and 13, respectively, through the cover 2 to the socket member 20 of a standard type of plug and socket connection 21, where the said leads 12 and 13 connect with the socket terminals 22 and 23, respectively. The plug member 24 of the connection 21 is wired up with suitable leads preferably in the form of a flexible twisted pair 25 terminating in any suitable form of connecting device such as the standard screw socket plug 26, whereby the plug terminals 27 and 28 may be connected with a suitable source of current. By the use of this plug and socket connection we are enabled to reverse the current in the apparatus from time to time, thus reversing the electrolytic connection on the electrodes, where direct current is used, for the purpose of equalizing the wear.

While the mounting members 14 and 15 have been indicated generally as being of any suitable insulating material, it is preferable to use slate, which practice is in keeping with the purpose of providing an apparatus of the present type which shall be durable, simple and inexpensive.

In operation, the outer vessel 1 is partly filled with water aproximately to the water level indicated, and the inner vessel is filled or partly filled with the glue or other substance to be heated, and with the members of the plug connection 21 engaged and connected as shown, the attachment plug 26 is connected with a source of current supply in the usual manner as through the screw socket of an electric light fixture not shown. Assuming the plug contacts 27 and 28 to be connected to the positive and negative mains, respectively, of the source of supply, current will pass from the plug contact 27 through the socket contact 22, lead 18, electrode 12, through the water contained in the outer vessel, over to the other electrode 13 and thence back by way of lead 19, socket contact 23 and plug contact 28. The flow of current as thus traced causes the water in the outer vessel to heat up and thereafter remain at a substantially constant temperature of the degree required for the purpose for which the apparatus is intended. Where alternating current is used, the circuit path is of course the same, but alternating in the direction of flow, and results in substantially the same heating effect as does the direct current, there being some advantage in the use of alternating current in that the wear on the electrodes due to electrolytic action is equalized. Where direct current is used, the wear on the electrodes may be equalized by reversing the connection between the plug contacts 27—28 and the socket contacts 22—23, from time to time. It is to be noted that the purpose of the screen 10 is to shield the electrodes from accidental short-circuiting by contact with any foreign object that might fall into the opening provided for the inner vessel, and protect the hand of a person from coming in contact with the electrodes should one attempt to test the temperature of the water by dipping the hand therein. It also serves as means for mounting the electrodes close to the inner vessel out of electrical and mechanical contact therewith. It is further to be noted that by extending the electrodes up above the water level and making the circuit connections therewith above such level, the use of water-tight insulating bushings is avoided and a consequent extra expense of manufacture and assembling.

Having thus described our invention what we claim and desire to secure by Letters Patent is:—

1. An electrically heated glue pot comprising a double boiler structure having an outer vessel and an inner vessel, a cover for said outer vessel containing an opening for the insertion of the inner vessel, a screen member supported from the said cover extending downwardly along the sides of the opening and under and across the bottom of the inner vessel, a plurality of electrodes extending along one side and the bottom of said screen mechanically supported thereby but electrically insulated therefrom, said electrodes extending vertically above a given level in the outer vessel and circuit connections for said electrodes entering said outer chamber through the cover and connecting with said electrodes at points above the said given level.

2. An electrically heated glue pot comprising an outer vessel adapted to contain water, a removable cover therefor, having an opening therein, an inner vessel extending down into said outer vessel below a given level therein and spaced from the bottom thereof, and supported solely by said cover, a set of L-shaped electrodes supported by said cover within said outer container and extending from points above said given level downwardly and laterally between the side and bottom walls of the inner and outer vessels, and circuit connections extending through an opening in said cover and connecting with said electrodes at points above said given level.

3. An electrically heated glue pot comprising an outer vessel adapted to contain water, a removable cover therefor, having an opening therein, an inner vessel extending down into said outer vessel below a given level therein and spaced from the bottom thereof, and supported solely by said cover, a set of L-shaped electrodes supported by said cover within said outer container and extending from points above said given level downwardly and laterally between the side and bottom walls of the inner and outer vessels, and circuit connections extending through an opening in said cover and connecting with said electrodes at points above said given level, together with circuit extension means for said circuit connections and means mounted on said top for reversing the connection between said circuit connections and said extension means operable to effect a reversal of the relation of the electrodes to the source of current for the purpose of equalizing the wear on the electrodes where direct current is used.

In testimony whereof we affix our signatures.

HARRY KAIN.
CON L. MILES.
GLENN A. WILKINSON.

Witnesses:
OLIVER WIBEL,
J. WILLIAM ECKERT.